United States Patent [19]
Sato et al.

[11] Patent Number: 5,831,602
[45] Date of Patent: Nov. 3, 1998

[54] INFORMATION PROCESSING APPARATUS, METHOD AND COMPUTER PROGRAM PRODUCT

[75] Inventors: Hajime Sato, Yokohama; Atsushi Tanaka, Yamato; Yuichiro Yoshimura, Kamakura; Ryozo Yanagisawa, Inzai; Katsuyuki Kobayashi, Yokohama; Masaki Tokioka, Fujisawa, all of Japan

[73] Assignee: Canon Kabushiki Kaisha, Tokyo, Japan

[21] Appl. No.: 773,890

[22] Filed: Dec. 27, 1996

[30] Foreign Application Priority Data

Jan. 11, 1996 [JP] Japan ................................. 8-002793

[51] Int. Cl.⁶ .................................................. G09G 5/00
[52] U.S. Cl. ............................................ 345/175; 345/173
[58] Field of Search ................................... 345/173, 174, 345/175, 179, 156; 349/12

[56] References Cited

U.S. PATENT DOCUMENTS

| | | | |
|---|---|---|---|
| 5,134,388 | 7/1992 | Murakami et al. ................... | 340/706 |
| 5,329,444 | 7/1994 | Takahashi et al. ................... | 364/401 |
| 5,396,443 | 3/1995 | Mese et al. ........................... | 364/707 |
| 5,440,502 | 8/1995 | Register ................................ | 345/179 |
| 5,455,906 | 10/1995 | Usuda ................................... | 345/173 |
| 5,552,568 | 9/1996 | Onodaka et al. ..................... | 345/156 |
| 5,633,660 | 5/1997 | Hansen et al. ....................... | 345/173 |

FOREIGN PATENT DOCUMENTS 562771  3/1993  Japan .

*Primary Examiner*—Richard A. Hjerpe
*Assistant Examiner*—Ricardo Osorio
*Attorney, Agent, or Firm*—Fitzpatrick, Cella, Harper & Scinto

[57] ABSTRACT

When coordinate information is inputted into input device 14, display controller 13 sets input area 16 based on the input coordinate information, and instructs work station (WS) 12 to lower the contrast of the input area 16. The WS 12 then sends an image signal where the contrast of the input area 16 is lowered on the display device 11. This solves the problem that, in a case where the contrast or brightness of a display screen of an electronic board is set for viewers but not for a presenter who inputs characters and figures on the electronic board, the presenter has an uncomfortable feeling from too high contrast or brightness.

12 Claims, 6 Drawing Sheets

INFORMATION PROCESSING APPARATUS, METHOD AND COMPUTER PROGRAM PRODUCT

BACKGROUND OF THE INVENTION

This invention relates to an information processing apparatus and method and, more particularly to an information processing apparatus having a coordinate input device and a display device, integrated in a layer structure, and method for the information processing apparatus.

As an information processing apparatus for displaying and explaining various information in a conference and the like, so-called electronic board is known. Many of the electronic boards are the white board type, and they are usually used for presentation and the like.

The electronic board comprises a coordinate input device such as a touch panel and a digitizer, and a display device such as a liquid crystal panel and a projector, integrated in a layer structure. By connecting the electronic board to a personal computer, a workstation or the like, display, recording, storing and reproduction of handwritten characters and figures can be made in realtime manner.

The coordinate input device for inputting handwritten characters and figures, including a resistance film type device, an electromagnetic induction type device, an ultrasonic-wave type device and the like, has human interface for natural input.

On the other hand, the display device is required to have a display screen as large as a white board, since the electronic board is often used by a number of users in a large area. For this purpose, the display device is constructed with a plurality of large display units or the combination of a projector and a screen.

Further, by connecting a system comprising electronic boards, located at many points, by a network, conference among remote places and collaboration work can be realized.

However, the above techniques have the following problems.

If the contrast or the brightness of the display device of the electronic board is set in consideration of the viewers (audience), the contrast and the brightness are sometimes too high for a presenter who inputs characters and figures on the electronic board, and in such case, the presenter may have an uncomfortable feeling. Particularly, when the presenter inputs characters and figures on the electronic board for a long time, the thought of the presenter is often disturbed by this unpleasant feeling.

SUMMARY OF THE INVENTION

The present invention has been made to solve the above problems, and has its object to provide an information processing apparatus and method which mitigates an unpleasant feeling to be given to a presenter, regardless of setting status of a display device.

According to the present invention, the foregoing object is attained by providing an information processing apparatus, comprising: input means for inputting coordinate information; image generation means for generating an image based on the coordinate information inputted by the input means; display means, integrated with the input means in a layer structure, for displaying the image generated by the image generation means; and control means for controlling display status of an area on the display means, corresponding to the input coordinate information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

<Construction>

Figure 1:
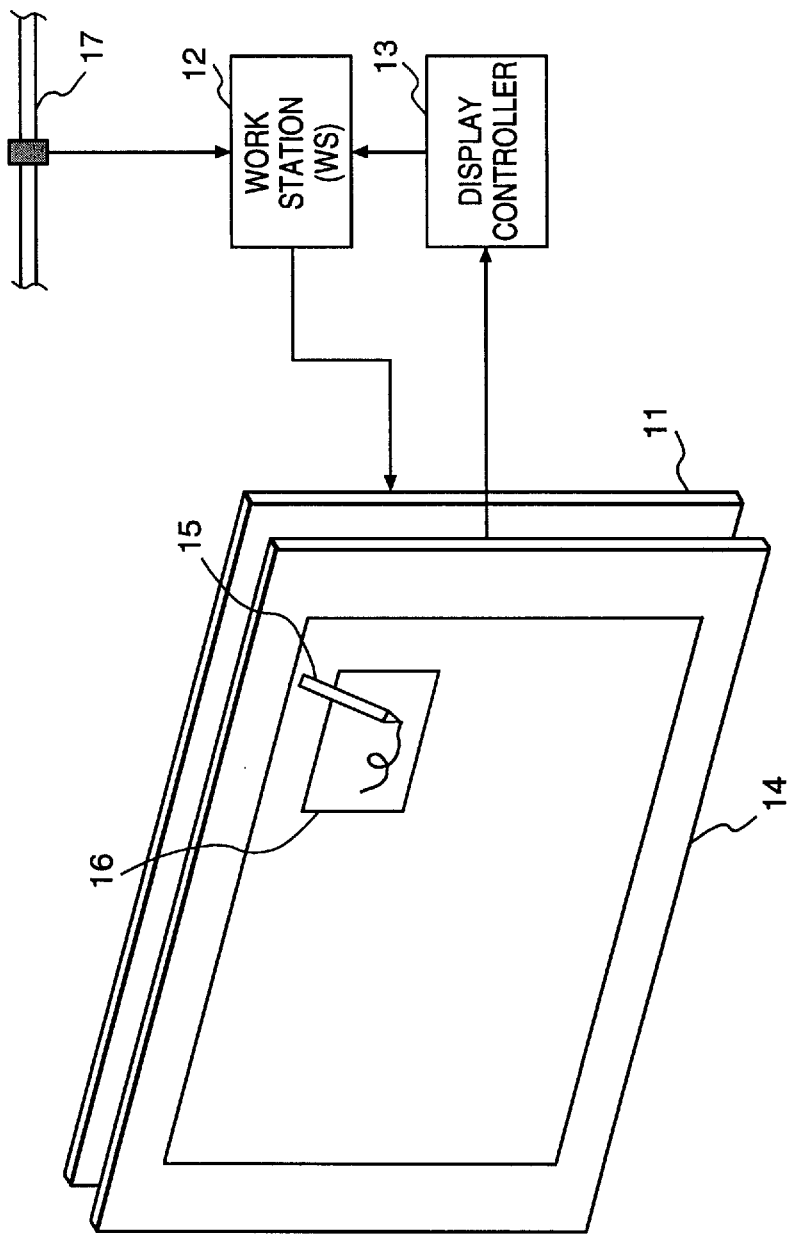
FIG. 1 is a block diagram showing the construction of an information processing apparatus according to a first embodiment of the present invention.

FIG. 1 shows the construction of an information processing apparatus according to a first embodiment of the present invention.

In FIG. 1, reference numeral 11 denotes a display device using liquid crystal or the like, for displaying images of various application programs which run on a workstation (WS) or personal computer 12. Numeral 13 denotes a display controller which controls the contrast of display of the display device 11. The display controller 13 sends a signal to change the contrast of a predetermined area to the WS 12, in accordance with output from an input unit 14. The input unit 14 is used for inputting characters and figures with a pen-type input device 15 of excellent operability. For example, an ultrasonic type digitizer having a glass input surface as disclosed in Japanese Patent Publication No. 5-62771 can be employed as the input unit 14. Numeral 16 denotes an input area, controlled by the display controller 13 in accordance with output from the input unit 14.

The display device 11 and the input unit 14 are integrated in a layer structure. For example, the input unit 14 is an ultrasonic type digitizer where piezoelectric sensors are provided at the four corners of the glass (input surface) which transmits an ultrasonic wave. In this case, the position (coordinates) where the input device 15 has touched the input surface is calculated from distances obtained by multiplying periods from a point where ultrasonic-wave vibration is generated by the input device 15 to points where the vibration reaches the piezoelectric sensors with the sonic speed of the ultrasonic-wave vibration. The WS 12 is connected to a communication line 17 of a local area network (LAN) or the like, for transmitting/receiving data and displaying information with other terminals connected to the communication line 17.

<Operation>

Figure 2:
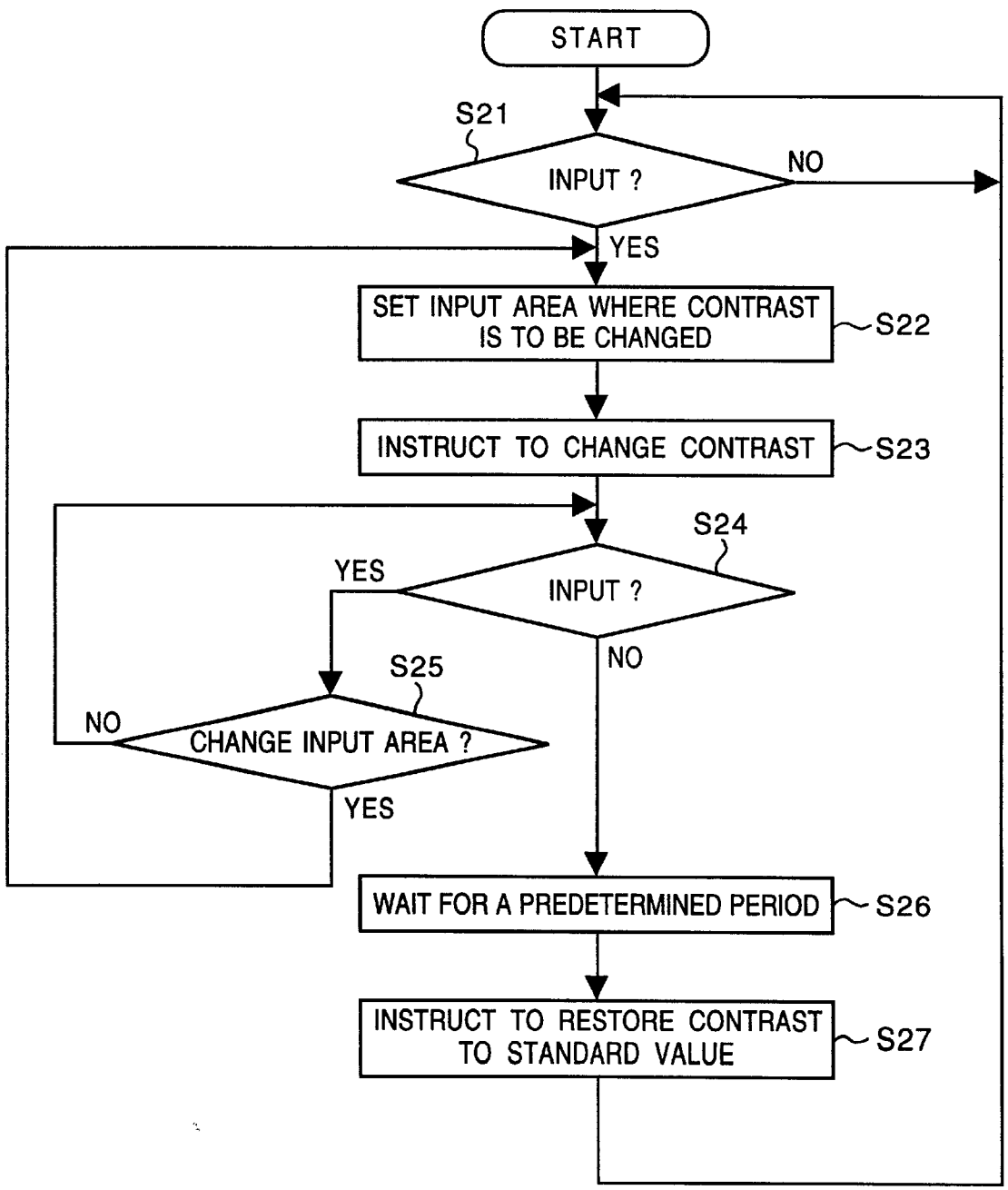
FIG. 2 is a flowchart showing the operation of a display controller in FIG. 1.

FIG. 2 is a flowchart showing the operation of the display controller 13.

At step S21, it is determined whether or not input has been made on the input unit 14. That is, it is detected whether or not there is a coordinate signal outputted by contact by the input device 15 with the input surface of the input unit 14. If it is determined that no input has been made, the processing at step S21 is repeated. If it is determined that there has been input on the input unit 14, the process proceeds to step S22, at which an area (input area 16) where the contrast is to be changed and the input information are set to the WS 12. The input area 16 where the contrast is to be changed is a rectangular area of a predetermined size, for example, with a coordinate value outputted from the input unit 14 as the center of the area.

Next, at step S23, a signal indicating changing (lowering) the contrast of the set input area 16 is outputted to the WS 12. At step S24, it is determined whether or not input has been made again. If YES, the process proceeds to step S25, at which it is determined whether or not the input area 16 must be changed. If YES, process returns to step S22, while if NO, returns to step S24.

If it is determined at step S24 that no input has been made, the process proceeds to step S26 to wait for a predetermined period. At step S27, a signal indicating restoring the contrast of the input area 16 to a standard value is outputted to the WS 12. Thereafter the process returns to step S21.

The above operation is executed in realtime manner in accordance with input by a presenter. By appropriately setting the waiting period at step S26, the presenter can input characters and figures without uncomfortable feeling, even if the contrast of the input area 16 is lowered.

Further, the input area 16 may jump, e.g., from the upper-left end to the lower-right end. In such case, the input area 16 where the contrast is lowered is immediately changed by the determination at step S25. This prevents any uncomfortable feeling to the presenter and viewers who are looking at the display screen. Further, since frequent movement of the input area 16 gives an uncomfortable feeling to the viewers, it may be arranged such that, if the coordinate value obtained at step S24 is within a predetermined range from the center of the input area 16, it is determined at step S25 that the input area 16 need not be changed.

Further, regarding the size and shape of the input area 16, the waiting period, the amount of changing the contrast, and the like, reference values are stored in the apparatus, and the values can be arbitrarily changed in accordance with the environment for using the apparatus. For example, the values are arbitrarily set in accordance with the brightness of illumination around the display screen, the distance between the display screen and the audience, and the like.

The above description has been made with regard to a case where the input area 16 is a rectangular area of a predetermined size having a coordinate value outputted from the input device 14 as the center of the area. However, the input area 16 may have a rectangular shape area having the coordinate value as the upper-left (or upper-right) corner of the area, otherwise, a circular or elliptical shape having the coordinate value as the center. Further, the contrast may be changed by gradation within a predetermined range from the input area 16 to a normal display area.

As described above, according to the present embodiment, the presenter, who is to input characters and figures, approaches to the display device having a large display screen and makes input operation towards the display screen. At this time, the contrast of the input area is changed so as to reduce uncomfortable feeling that the presenter has, regardless of setting status of the display device.

Second Embodiment

Next, the information processing apparatus according to a second embodiment of the present invention will be described.

Note that in this embodiment, the elements corresponding to those of the first embodiment have the same reference numerals, and the explanation of those elements will be omitted.

In the first embodiment, the contrast of the input area is changed so as to reduce the uncomfortable feeling given to the presenter; in the second embodiment, the brightness of the input area is changed so as to obtain similar effect.

<Construction>

Figure 3:
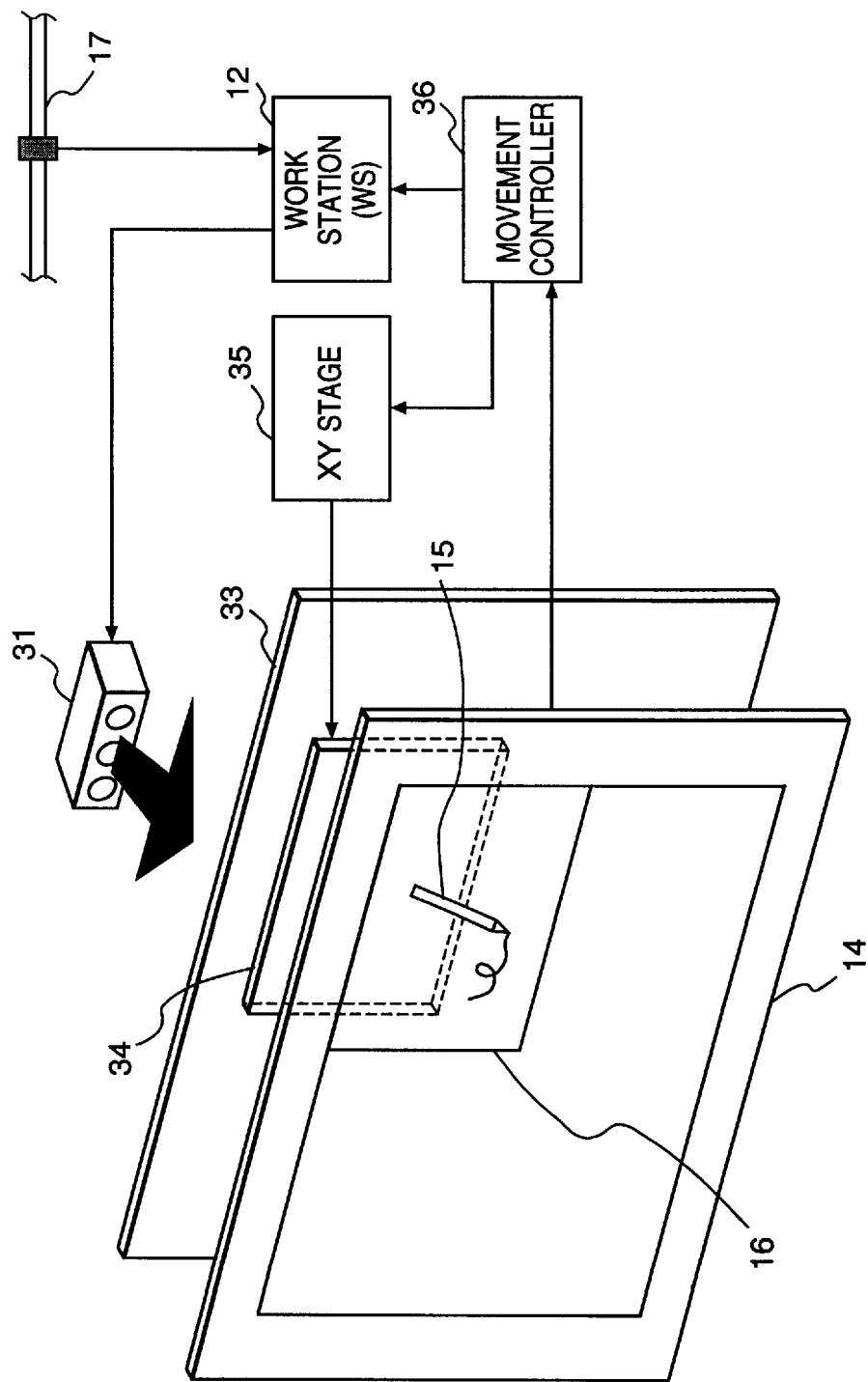
FIG. 3 is a block diagram showing the construction of the information processing apparatus according to a second embodiment of the present invention.

FIG. 3 shows the construction of the information processing apparatus according to the second embodiment.

In FIG. 3, numeral 31 denotes a projector which projects screen images of various application programs which run on the WS (or personal computer) 12 on a transparent-type screen 33. Numeral 36 denotes a movement controller which controls the position of a dimmering filter 34 by controlling an XY stage 35, thus controls the brightness of the input area 16. The movement controller 36 moves the dimmering filter 34 in accordance with output from the input unit 14. The dimmering filter 34 is a resin film or plate, for example, having a predetermined transmittance.

<Operation>

Next, the operation of the above construction will be described. The projector 31 projects an image received from the WS 12 onto the transparent-type screen 33. The projected image from the projector 33 can be seen through the input unit 14 integrated with the screen 33 in a layer structure. The movement controller 36 controls the XY stage 35 in accordance with a coordinate output value from the input unit 14, to move the dimmering filter 34 for lowering the brightness of the image formed on the screen 33, into the input area 16 within a display area.

Accordingly, the brightness of the image on the screen 33 within the input area 16 can be lowered by moving the dimmering filter 34 into the input area 16. This reduces the uncomfortable feeling given to the presenter, regardless of setting status of the display service.

Modification

Figure 4:
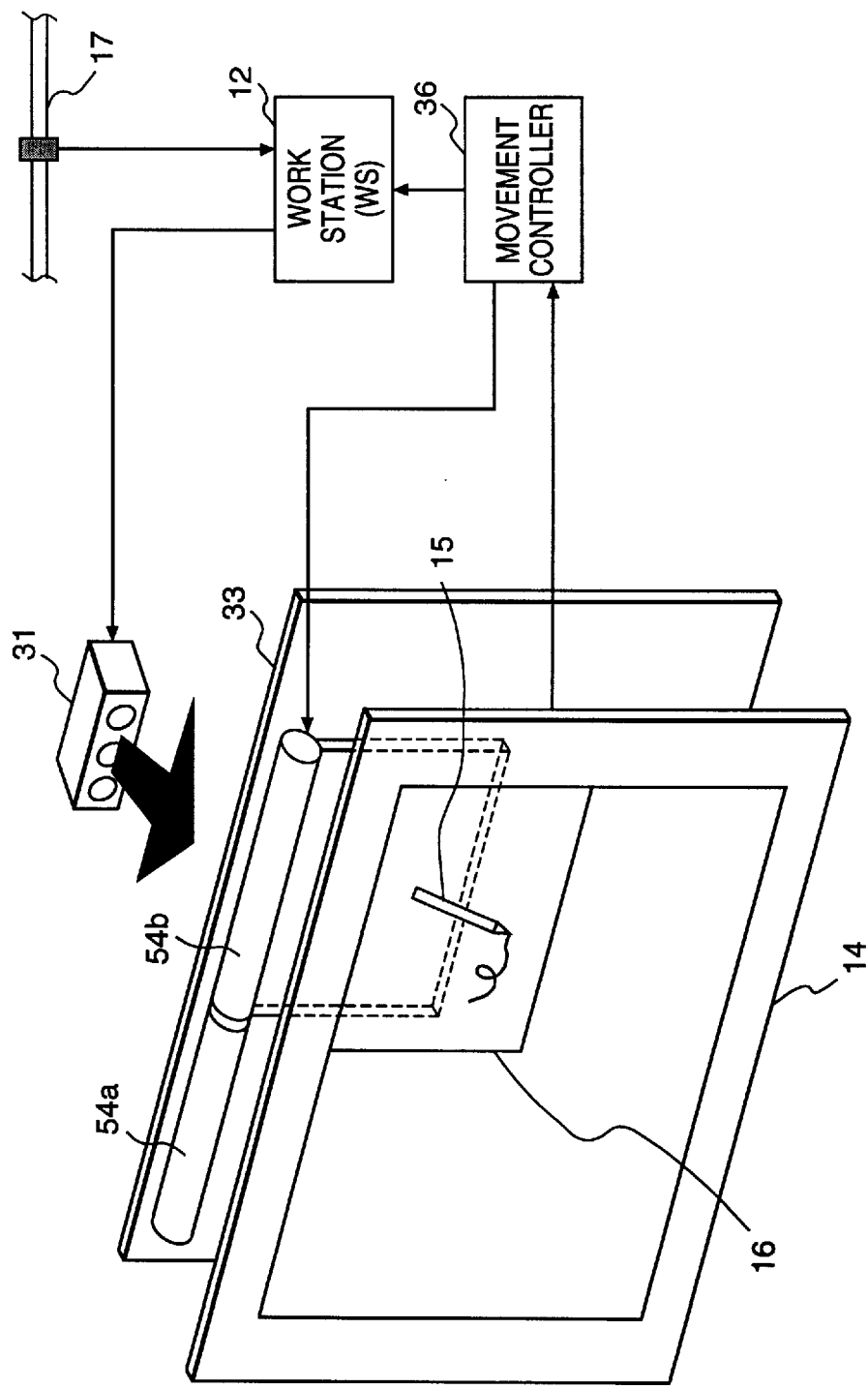
FIG. 4 is a block diagram showing the construction of the information processing apparatus as a modification to the second embodiment.

The construction in FIG. 3 requires a support member such as a coupling arm for connecting the dimmering filter 34 to the XY stage 35. Even if the support member is constructed with transparent material, the viewers see the shadow of the support member to a certain degree. This observation can be removed by constructing the apparatus as shown in FIG. 4. In FIG. 4, the film or plate dimmering filter 34 is replaced with rolls of dimmering filters 54*a* and 54*b* provided at the upper position of the screen 33. The dimmering filters 54*a* or 54*b* is pulled out or rolled up in accordance with a coordinate output value from the input unit 14.

Further, in FIG. 3, the dimmering filter 34 is arranged between the screen 33 and the input unit 14, however, the dimmering filter 34 may be arranged between the screen 33 and the projector 31 so far as it is a film type thin filter.

Furthermore, it may be arranged such that, in the video signal outputted from the WS 12 to the projector 31, the brightness level of a portion of the input area 16 is directly reduced.

Third Embodiment

Next, the information processing apparatus according to a third embodiment of the present invention will be described.

In this embodiment, the element corresponding to those of the first embodiment have the same reference numerals, and the explanation of those elements will be omitted.

The third embodiment will be described as a case where the present invention is applied to the information processing apparatus having a large display screen comprising a plurality of liquid crystal display devices.

Figure 5:
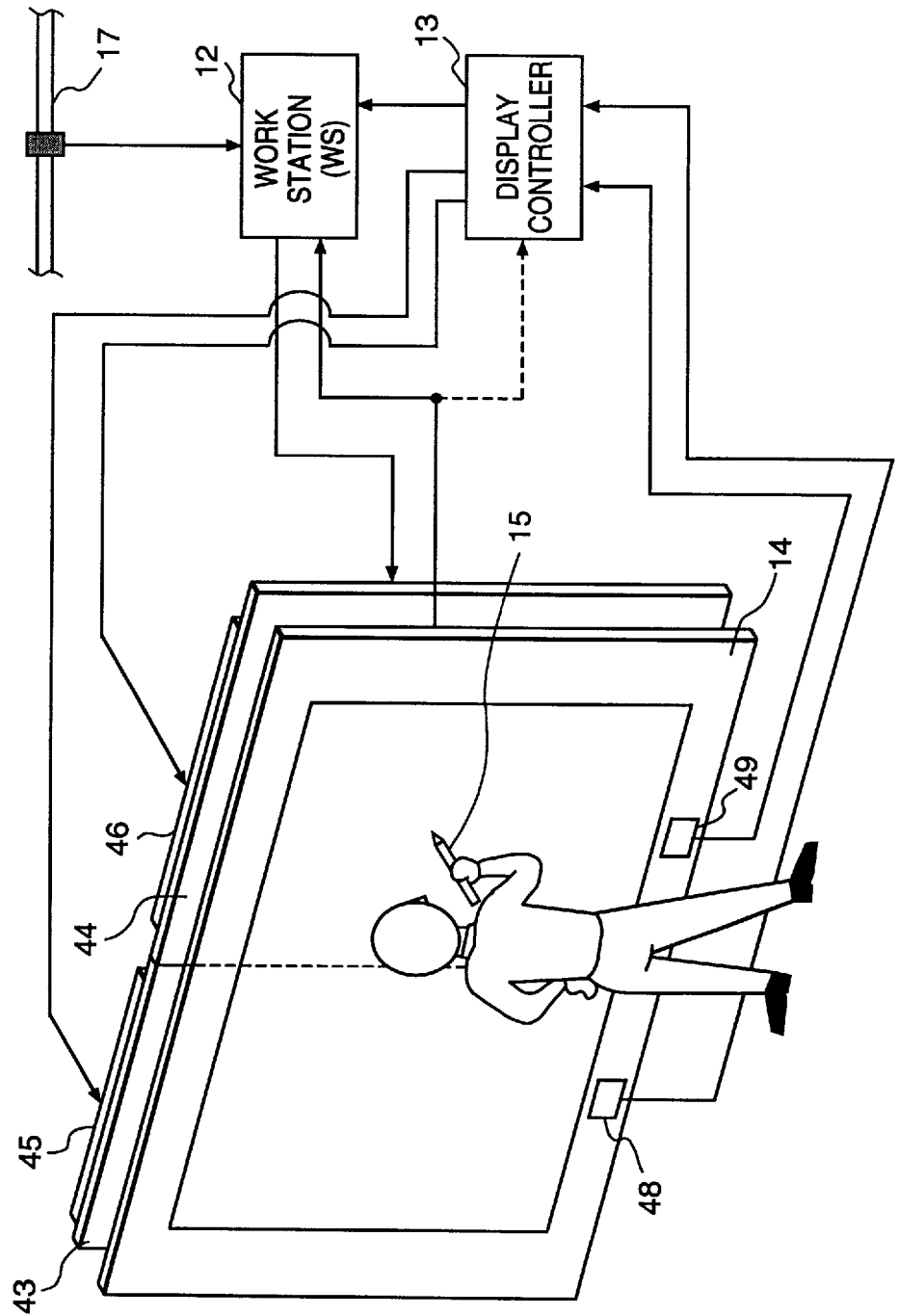
FIG. 5 is a block diagram showing the construction of the information processing apparatus according to a third embodiment of the present invention.

FIG. 5 shows the construction of the information processing apparatus according to the third embodiment.

In FIG. 5, numerals 43 and 44 denote liquid crystal display devices constituting one display screen. The liquid crystal display devices 43 and 44 have back lights 45 and 46 respectively. Numerals 48 and 49 denote objective sensors for the liquid crystal display devices 43 and 44.

In this embodiment, display images of various application programs, which run on the WS 12, are displayed on the display screen constituted with the liquid crystal display devices 43 and 44. The input unit 14 is integrated with the liquid crystal display devices 43 and 44 in a layer structure, and the objective sensors 48 and 49 are provided at lower positions of the surface of the input unit 14. The objective sensors 48 and 49 are sensors for detecting, e.g., infrared rays. The objective sensors 48 and 49 detect that the presenter has come closer to the input unit 14 and output a detection signal to the display controller 13. The display controller 13 lowers the brightness of the backlight of the liquid crystal display devices 43 or 44 corresponding to the detection signal.

Accordingly, the brightness of the liquid crystal display device 43 or 44, which the presenter has approached, is lowered, so that the uncomfortable feeling given to the presenter is reduced regardless of setting statuses of the liquid crystal display devices 43 and 44.

Similar to the first embodiment, the WS 12 may change the contrast of the liquid crystal 43 or 44 which the presenter has approached. Also, similar to the first embodiment, by inputting a coordinate value signal outputted from the input unit 14 into the display controller 13, the contrast of an area of a predetermined size, with the coordinate value as the center of the area, can be lowered.

Modification to the Embodiments

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 6:
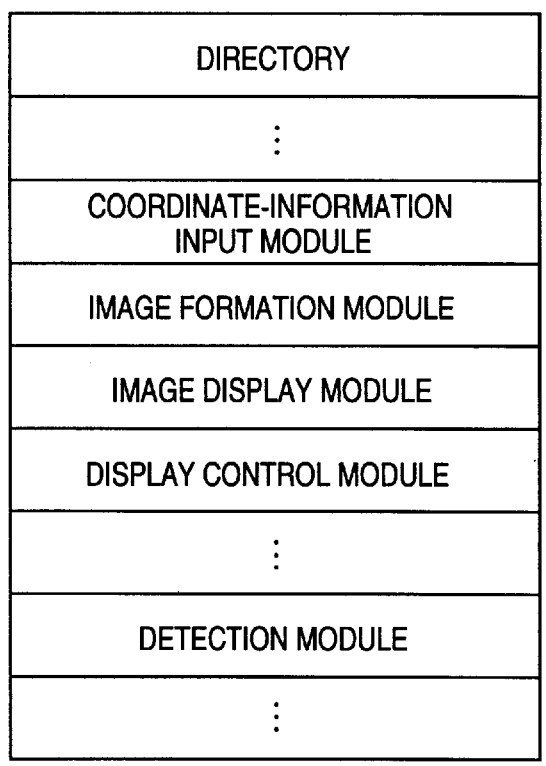
FIG. 6 is a memory map of a storage medium containing program codes according to the present invention.

In a case where the present invention is applied to the aforesaid storage medium, the storage medium stores program codes corresponding to the flowchart described in the embodiment. Briefly, the storage medium stores each module shown as an example of a memory map in FIG. 6. More specifically, program codes which correspond to "input" module, "image formation" module, "image display" module, and "display control" module, at least, are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus, comprising:

a coordinate input unit;

an image generation unit, wherein an image can be generated based on coordinate information input by said input unit;

a display device, integrated with said input unit in a layer structure, wherein the image generated by said image generation unit can be displayed by said display device; and a controller which is adapted to control brightness or contrast in an area having a predetermined shape and size on said display device, wherein a position of the area is defined by the input coordinate information as a center point or a corner point of the area.

2. The information processing apparatus according to claim 1, wherein said controller is also adapted to control said image generation unit so as to reduce the brightness or the contrast in the area.

3. The information processing apparatus according to claim 1, further comprising a dimmer device, wherein said controller reduces the brightness of the area using said dimmer device.

4. The information processing apparatus according to claim 3, wherein said controller reduces the brightness of the area by moving said dimmer device to the area.

5. An information processing apparatus, comprising:

a coordinate input unit;

an image generation unit, wherein an image based on coordinate information input by said input unit can be generated;

a display device, integrated with said input unit in a layer structure, wherein the image generated by said image generation unit can be displayed;

at least one sensor; and a controller adapted to control brightness or contrast of a portion in an area on said display device in accordance with a signal received from said at least one sensor, wherein the signal is based on detecting an object approaching said display device, wherein a position of the area is defined by the input coordinate information as a center point or a corner point of the area.

6. The information processing apparatus according to claim 5, wherein said at least one sensor detects a human body approaching said input unit.

7. The information processing apparatus according to claim 5, wherein said controller is adapted to control said display device to reduce the brightness or the contrast of the portion of the displaying area.

8. The information processing apparatus according to claim 6, wherein said controller is adapted to control said display device to reduce the brightness or the contrast of the portion of the displaying area when the human body approaches said input unit.

9. An information processing method comprising:

inputting coordinate information using an input unit;

generating an image based on the input coordinate information;

displaying the generated image on a display device integrated with the input unit in a layer structure; and controlling brightness or contrast in an area having a predetermined shape and size on the display device, wherein a position of the area is defined by the input coordinate information as a center point or a corner point of the area.

10. An information processing method comprising the steps of:

inputting coordinate information using an input unit;

generating an image based on the input coordinate information;

displaying the generated image on a display device integrated with the input unit in a layer structure;

detecting an object approaching the display device; and controlling brightness or contrast in a portion of a displaying area on the display device in accordance with a detection result in said detection step, wherein a position of the displaying area is defined by the input coordinate information as a center point or a corner point of the area.

11. A computer program product comprising a computer-readable medium having computer program instructions for executing information processing, said product comprising:

instructions for inputting coordinate information using an input device;

instructions for generating an image based on the input coordinate information;

instructions for displaying the generated image on a display device integrated with the input device in a layer structure; and instructions for controlling brightness or contrast in an area having a predetermined shape and size on the display device, wherein a position of the area is defined by the input coordinate information as a center point or a corner point of the area.

12. A computer program product comprising a computer-readable medium having computer program instructions for executing information processing, said product comprising:

instructions for inputting coordinate information using an input device;

instructions for generating an image based on the input coordinate information;

instructions for displaying the generated image a display device integrated with the input device in a layer structure;

instructions for detecting an object approaching the display device; and instructions for controlling brightness or contrast in a portion of a displaying area on the display device in accordance with a detection result in said detecting instructions, wherein a position of the displaying area is defined by the input coordinate information as a center point or a corner point of the area.

* * * * *

UNITED STATES PATENT AND TRADEMARK OFFICE
CERTIFICATE OF CORRECTION

PATENT NO. : 5,831,602

DATED : November 3, 1998

INVENTOR(S) : HAJIME SATO ET AL.

It is certified that error appears in the above-identified patent and that said Letters Patent is hereby corrected as shown below:

On the title page, item

[56] FOREIGN PATENT DOCUMENTS

"562771" should read --5-62771--;

COLUMN 4

Line 4, "feeling" should read --feelings--;
Line 28, "35," should read --35 and--;
Line 64, "is" should read --are--;

COLUMN 5

Line 55, "be also" should read --also be--;

UNITED STATES PATENT AND TRADEMARK OFFICE
CERTIFICATE OF CORRECTION

PATENT NO. : 5,831,602

DATED : November 3, 1998

INVENTOR(S) : HAJIME SATO ET AL

It is certified that error appears in the above-identified patent and that said Letters Patent is hereby corrected as shown below:

<u>COLUMN 6</u>

Line 10, "case" should read --a case--.

Signed and Sealed this

Seventeenth Day of August, 1999

Attest:

Q. TODD DICKINSON

Attesting Officer

Acting Commissioner of Patents and Trademarks